United States Patent
Yokota

(10) Patent No.: US 10,168,958 B2
(45) Date of Patent: Jan. 1, 2019

(54) INFORMATION PROCESSING SYSTEM, METHOD IN INFORMATION PROCESSING SYSTEM, AND STORAGE MEDIUM

(71) Applicant: CANON KABUSHIKI KAISHA, Tokyo (JP)

(72) Inventor: Kazuyuki Yokota, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/662,700

(22) Filed: Jul. 28, 2017

(65) Prior Publication Data

US 2018/0040100 A1     Feb. 8, 2018

(30) Foreign Application Priority Data

Aug. 2, 2016   (JP) .................................. 2016-152132

(51) Int. Cl.
*G06F 3/06*     (2006.01)
*G06F 13/42*    (2006.01)
(Continued)

(52) U.S. Cl.
CPC .......... *G06F 3/0659* (2013.01); *G06F 3/0629* (2013.01); *G06F 3/0635* (2013.01);
(Continued)

(58) Field of Classification Search
CPC .... G06F 3/0601; G06F 3/0628; G06F 3/0629; G06F 3/0635; G06F 3/0655; G06F 3/0658; G06F 3/0659; G06F 3/0661; G06F 2003/0697; G06F 9/44; G06F 12/0246; G06F 13/1668; G06F 13/28; G06F 13/38;
(Continued)

(56) References Cited

U.S. PATENT DOCUMENTS 5,361,346 A * 11/1994 Panesar ............... G06F 11/2221
                                                        714/42
6,601,119 B1 * 7/2003 Slutz ....................... G06F 13/38
                                                        710/104
(Continued)

FOREIGN PATENT DOCUMENTS

JP          06152916 A      5/1994
KR      20080010492 A  *   1/2008

*Primary Examiner* — Thomas J Cleary
(74) *Attorney, Agent, or Firm* — Venable LLP

(57) ABSTRACT

An object is to make it possible to add a vendor-unique command at the time at which addition of a vendor-unique command becomes necessary later even in the case where the device side does not have a dedicate pin for updating in communication control based on a SATA standard. An information processing system that performs data communication between a host and a device in conformity with the SATA standard, and the host transmits a setup command to which information on an undefined command is written to the device, and the device: has a command table for commands in conformity with the SATA standard, in which a command code to identify each command and information on a transfer protocol of each command are described; and makes the undefined command available between the host and the device by writing information on the undefined command to the command table in accordance with the received setup command.

13 Claims, 19 Drawing Sheets

(51) Int. Cl.
  *G06T 1/60* (2006.01)
  *H04L 29/06* (2006.01)
  *H04N 1/32* (2006.01)
  *G06F 9/44* (2018.01)
  *G06F 12/02* (2006.01)
  *G06F 13/28* (2006.01)

(52) U.S. Cl.
  CPC ............ G06F 13/4282 (2013.01); G06T 1/60 (2013.01); H04L 29/06 (2013.01); H04N 1/32101 (2013.01); *G06F 9/44* (2013.01); *G06F 12/0246* (2013.01); *G06F 13/28* (2013.01); *H04N 1/32512* (2013.01)

(58) Field of Classification Search
  CPC .... G06F 13/382; G06F 13/385; G06F 13/387; G06F 13/42; G06F 13/4221; G06F 13/4282; G06T 1/60; H04L 29/06; H04N 1/32101; H04N 1/32512
  See application file for complete search history.

(56) References Cited

U.S. PATENT DOCUMENTS

| | | | |
|---|---|---|---|
| 7,315,914 B1* | 1/2008 | Venkatanarayanan | G06F 3/0605 710/305 |
| 8,583,835 B1* | 11/2013 | Kan | G06F 3/0622 710/5 |
| 2004/0193758 A1* | 9/2004 | Zayas | G06F 9/547 710/36 |
| 2008/0091935 A1* | 4/2008 | Song | G06F 8/60 713/2 |
| 2009/0210637 A1* | 8/2009 | Yung | G06F 13/385 711/154 |
| 2011/0296062 A1* | 12/2011 | Isobe | G06F 3/0613 710/22 |
| 2015/0277790 A1* | 10/2015 | Mozak | G06F 3/0619 711/166 |

* cited by examiner

FIG.6A

RegHD-FIS

601

| 0 | Features | Command | C | R | R | Reserved | 27h (FIS Type) |
|---|---|---|---|---|---|---|---|
| 1 | Dev / Head | Cyl High | Cyl Low | | | | Sector Number |
| 2 | Features (exp) | Cyl High (exp) | Cyl Low (exp) | | | | Sector Number (exp) |
| 3 | Control | Reserved | Sector Count (exp) | | | | Sector Count |
| 4 | Reserved | Reserved | Reserved | | | | Reserved |

FIG.6B

Data-FIS

| 0 | Reserved | Reserved | R | R | R | Reserved | 46h (FIS Type) |
|---|---|---|---|---|---|---|---|
| 1 | Data | | | | | | |

PIOSU

| 0 | Error | Status | R | I | R | Reserved | 5Fh (FIS Type) |
|---|---|---|---|---|---|---|---|
| 1 | Dev / Head | Cyl High | Cyl Low | | | | Sector Number |
| 2 | Features (exp) | Cyl High (exp) | Cyl Low (exp) | | | | Sector Number (exp) |
| 3 | E_Status | Reserved | Sector Count (exp) | | | | Sector Count |
| 4 | Reserved | | Transfer Count | | | | |

FIG.6D

RegDH-FIS

| 0 | Error | Status | R | I | R | Reserved | 34h (FIS Type) |
|---|---|---|---|---|---|---|---|
| 1 | Dev / Head | Cyl High | Cyl Low | | | | Sector Number |
| 2 | Reserved | Cyl High (exp) | Cyl Low (exp) | | | | Sector Number (exp) |
| 3 | Reserved | Reserved | Sector Count (exp) | | | | Sector Count |
| 4 | Reserved | Reserved | Reserved | | | | Reserved |

RegHD-FIS 601

| | | | | |
|---|---|---|---|---|
| 0 | Features | C R R Reserved | Reserved | 27h (FIS Type) |
| 1 | Dev / Head | | Cyl Low | Sector Number |
| 2 | Features (exp) | | Cyl Low (exp) | Sector Number (exp) |
| 3 | Control | | Reserved | Sector Count |
| 4 | Reserved | | Reserved | Reserved |

Row 0: 0xF0 — Command code for setup command
Row 2: Cyl High
Row 2: Cyl High (exp)

Data-FIS 602

| | | | | |
|---|---|---|---|---|
| 0 | Reserved | R R R Reserved | Reserved | 46h (FIS Type) |
| 1 | 0xC1 | 0x01 | 0x00 | 0x00 |

Row 1: Command code of additional command — Transfer protocol of additional command RegHD-FIS

| | | | | | |
|---|---|---|---|---|---|
| 0 | Features | *0xF0* *<Command code for setup command>* | C | R | R | Reserved | 27h (FIS Type) |
| 1 | Dev / Head | | | Cyl Low | Sector Number |
| 2 | Features (exp) | | | Cyl Low (exp) | Sector Number (exp) |
| 3 | Control | | | Reserved | Sector Count |
| 4 | Reserved | | | Reserved | Reserved |

Data-FIS

| | | | | | |
|---|---|---|---|---|---|
| 0 | Reserved | | R | R | R | Reserved | 46h (FIS Type) |
| 1 | *0xC1* *<Command code of additional command>* | *0x01* *<Transfer protocol of additional command>* | *0x11* *<Setting destination of additional command>* | 0x00 |

FIG.18

INFORMATION PROCESSING SYSTEM, METHOD IN INFORMATION PROCESSING SYSTEM, AND STORAGE MEDIUM

BACKGROUND OF THE INVENTION

Field of the Invention

The present invention relates to communication control based on a SATA standard.

Description of the Related Art

In an image processing apparatus, such as an MFP (Multi Function Printer), a hard disk drive (HDD) is frequently used as a storage device to save input image data. Further, in recent years, by a request for high image quality and high performance processing of input image data, demand for a storage device, for example, an SSD (Solid State Drive), capable of high-speed processing is increasing. Then, data communication between a storage device, such as the HDD and the SSD, and an MFP is performed in general based on a Serial-ATA (SATA) standard.

Here, in commands of the SATA standard, a transfer protocol is associated with each command code. It is made possible for both a host (corresponding to the above-described MFP) and a device (corresponding to the above-described HDD and SSD) to perform data communication by grasping the transfer protocol. On the other hand, among commands of the SATA standard, a command code not associated with a transfer protocol exists. With the command code not associated with a transfer protocol, a vendor may associate a transfer protocol unique to the vendor and this is called a vendor-unique command. By using this vendor-unique command, it is made possible to make a request for various kinds of data processing to a device.

The above-described vendor-unique command is made use of by associating a transfer protocol with a command code, and therefore, it is necessary for both the host and the device to define the transfer protocol in advance. That is, information on the transfer protocol is absolutely indispensable to both. The case is supposed where the host transfers a vendor-unique command for which association with a transfer protocol is not performed on the device side to the device. In this case, the device side does not know the transfer protocol of the vendor-unique command that is sent. Because of this, the device side does not know how to process the received vendor-unique command, and therefore, the device side aborts execution of the program and performs processing to return an error. Regarding this point, for example, Japanese Patent Laid-Open No. H06-152916 (1994) has disclosed a method of enabling an additional setting with extendability as to an additional setting method of a vendor-unique command to a facsimile device. Specifically, in a ROM within the facsimile device, tables of each of command, address, and code are held and at the time of power on, RAM addresses are read sequentially from the address table and a code stored in the command table is stored in the area corresponding to the RAM address. Due to this, from the code table that has been rewritten at the time of power on, a vendor-unique command is created and as a result, addition and editing of a vendor-unique command are enabled.

With the method of Japanese Patent Laid-Open No. H06-152916 (1994) described above, it is possible to add and change a vendor-unique command by the host updating the code table of the host itself (or by the device updating the code table of the device itself). However, in order to perform updating, a dedicated pin is necessary, but some HDDs or SSDs have only a limited number of dedicated pins in view of cost and the like or have no dedicated pin originally. In a system configuration including such a storage device, it is difficult to apply the method of Japanese Patent Laid-Open No. H06-152916 (1994) described above.

An object of the present invention is to make it possible to add a vendor-unique command in the case where addition of a vendor-unique command becomes necessary later even in a situation in which a device side does not have a dedicated pin for updating in communication control based on a SATA standard.

SUMMARY OF THE INVENTION

The information processing system according to the present invention is an information processing system that performs data communication between a host and a device in conformity with a SATA standard, and the host transmits a setup command to which information on an undefined command is written to the device, and the device has: a command table for commands in conformity with the SATA standard, in which a command code to identify each command and information on a transfer protocol of each command are described; and makes the undefined command available between the host and the device by writing information on the undefined command to the command table in accordance with the received setup command.

Further features of the present invention will become apparent from the following description of exemplary embodiments with reference to the attached drawings.

BRIEF DESCRIPTION OF THE DRAWINGS

FIG. 6A to FIG. 6D are diagrams showing structures of a FIS that is used at the time of performing data communication by a PIO data Out protocol;

FIG. 7 is a diagram showing details of a setup command according to the first embodiment;

FIG. 18 is a diagram showing an example of an internal configuration of a setup command according to the third embodiment.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

Figure 1:
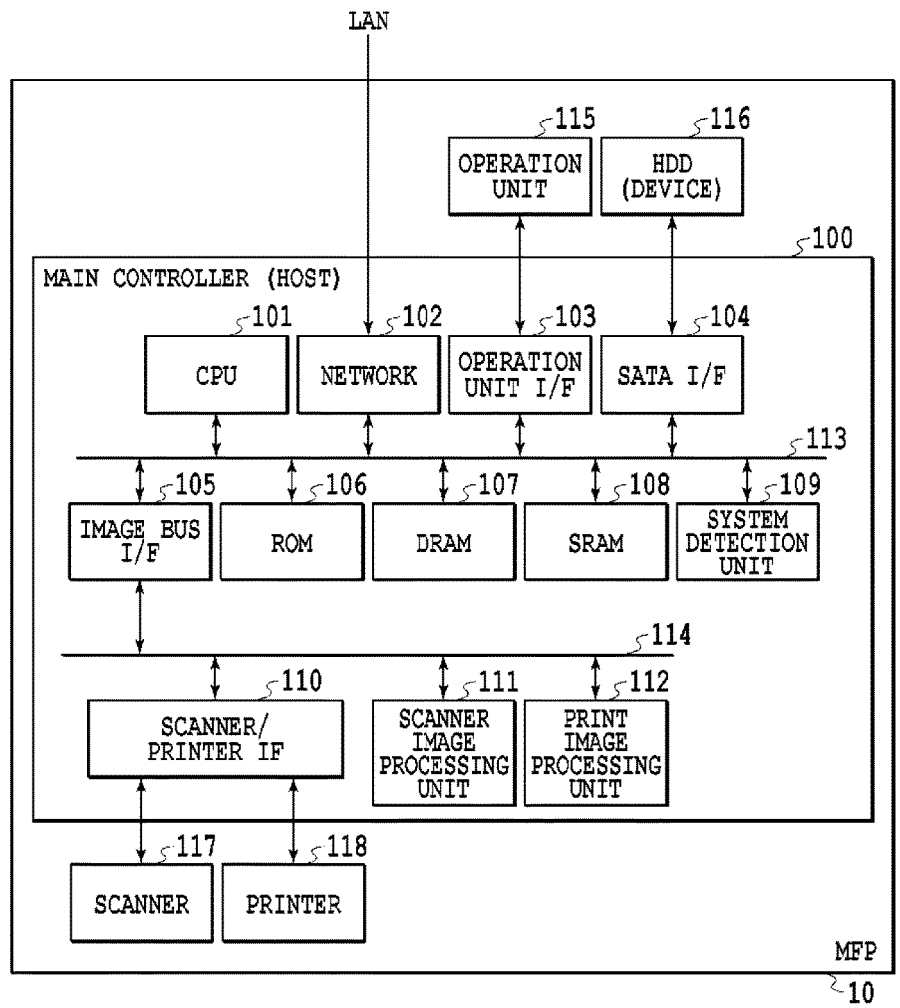
FIG. 1 is a block diagram showing an entire configuration of an MFP as an information processing system.

FIG. 1 is a block diagram showing an entire configuration of an MFP as an information processing system according to the present embodiment. In the present embodiment, explanation is given in the configuration of one closed information processing apparatus, i.e., an MFP, but it is possible to widely apply the present embodiment to an information processing system including a host and a device, which performs data communication in conformity with a Serial-ATA (SATA) standard.

A main controller (corresponding to a host) 100 of an MFP 10 includes a CPU 101, a ROM 106, a DRAM 107, an SRAM 108, five IFs (102, 103, 104, 105, 110), and two image processing units (111, 112). Then, the above-described components of the main controller 100 are connected via a system bus 113 or an image bus 114.

The CPU 101 is a processor that controls the entire MFP 10 and performs various kinds of control and arithmetic operation processing based on programs stored in the ROM 106 and the like. The network I/F 102 connects to a network, such as a LAN, and receives, for example, a print job and the like from an external device, such as a PC not shown schematically. The operation unit I/F 103 controls the output of image data to be displayed on an operation unit 115 and the input operation performed by a user on the operation unit 115. The SATA I/F 104 is an interface that inputs and outputs data to and from an HDD 116 as a device in conformity with the SATA standard. The image bus I/F 105 is a bridge that connects the system bus 113 and the image bus 114 and transfers data at a high speed. The ROM 106 is a read-only memory and used as a ROM for boot and in the ROM 106, a boot program of the system is stored. The DRAM 107 is a system work memory for the CPU 101 to operate. Further, the DRAM 107 also plays a role as an image memory to temporarily store image data. The SRAM 108 is a nonvolatile memory and stores setting data of the system. A system detection unit 109 monitors the power mode of the entire system and gives instructions to supply power to each unit. The scanner/printer I/F 110 connects a scanner 117 and a printer 118 to the main controller 100 and performs input/output control of image data. The scanner image processing unit 111 performs various kinds of image processing, such as magnification and MTF correction, for scanned image data read by the scanner 117. The print image processing unit 112 performs various kinds of image processing, such as γ correction and quantization to generate image data to be output to the printer 118.

The system bus 113 represents a control bus, a data bus, local buses between arbitrary blocks, and signal lines all together as one unit as a matter of convenience. The image bus 114 represents PCI buses all together as one unit as a matter of convenience. The operation unit 115 is a user interface, such as a touch panel having both the display function and the operation function, and plays a role to display input image data and a role to convey information input by a user to the CPU 101. The HDD 116 is a storage device that stores a comparatively large capacity of data and stores system software, various applications, image data, and management information thereon. The HDD 116 may be any large-capacity storage device in conformity with the SATA standard and may be another kind of storage device, such as an SSD. The scanner 117 optically reads a document set on a document table and the like, not shown schematically, and converts into an electric signal, and generates raster image data (scanned image data) represented by, for example, RGB. The printer 118 forms an image in accordance with print image data generated by the print image processing unit 112 on a printing medium, such as paper, by, for example, an electrophotographic scheme or an ink jet scheme.

Figure 2:
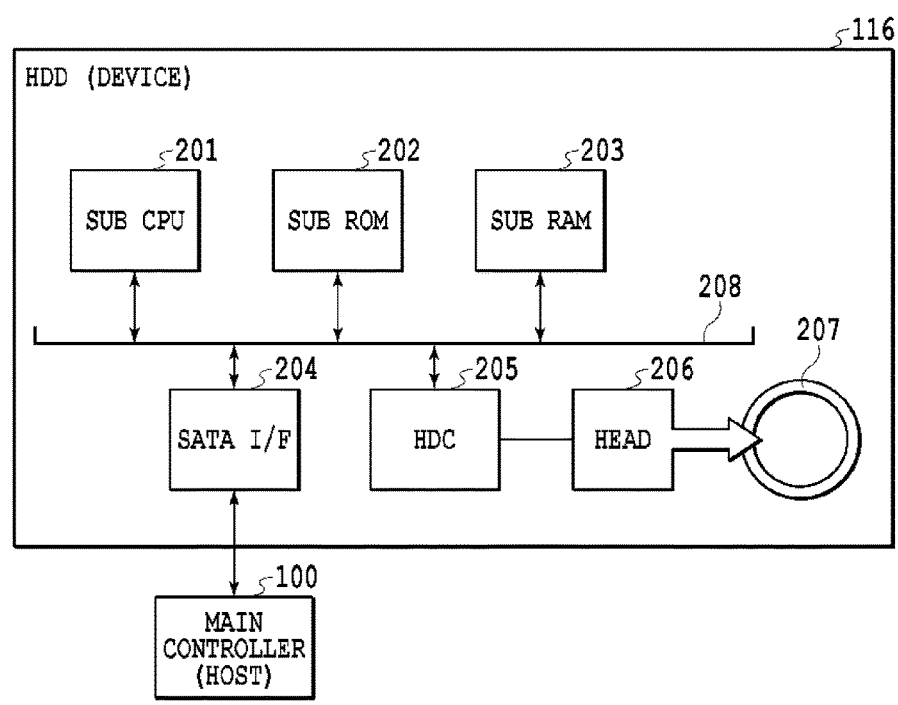
FIG. 2 is a block diagram showing an internal configuration of an HDD.

FIG. 2 is a block diagram showing an internal configuration of the HDD 116. A sub CPU 201 is a processor that governs control of processing of a SATA command by a device/task file register (hereinafter, device TFR), not shown schematically, transfer processing of transmission/reception data, and so on. A sub ROM 202 is a writable ROM, for example, such as a flash memory, which stores control programs and various parameters to activate the HDD 116. A sub RAM 203 is a readable/writable memory that is used as a work area of the sub CPU 201 and a loading area of a command table. A SATA-I/F 204 is an interface that inputs and outputs data to and from the main controller 100. An HDD controller (HDC) 205 is a controller that controls a head 206 and causes a magnetic disc 207 to store data. The head 206 writes and read data to and from the magnetic disc 207 by magnetism. The magnetic disc 207 is made up of a magnetic layer obtained by applying magnetic material to a disc, and stores data by making use of magnetism. Then, the sub CPU 201, the sub ROM 202, the sub RAM 203, the SATA-I/F 204, and the HDC 205 are connected to one another via a bus 208.

Figure 3:
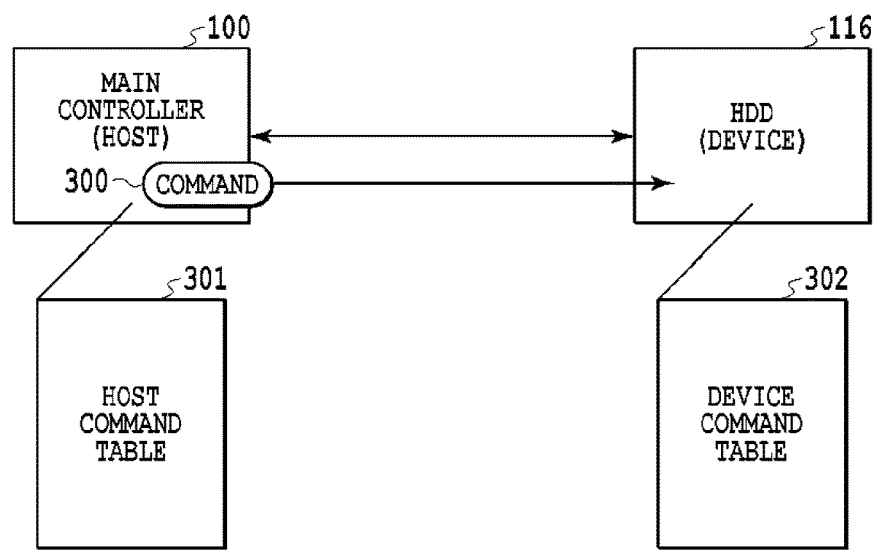
FIG. 3 is a diagram showing an outline of command transfer from a main controller to the HDD according to a first embodiment.

Next, command transfer from the main controller 100 as a host to the HDD 116 as a device is explained. FIG. 3 is a diagram showing an outline of command transfer from the main controller 100 to the HDD 116 according to the present embodiment.

In the case where the main controller 100 transfers an arbitrary command 300 to the HDD 116, both the main controller 100 and the HDD 116 determine a transfer protocol from a command code described within the command 300 and control transmission/reception of data. The CPU 101 within the main controller 100 determines the transfer protocol of the command 300 by referring to a host command table 301 and collating the command code of the command 300 to be transferred with the host command table 301. Then, the sub CPU 201 within the HDD 116 determines the transfer protocol of the command 300 by reading the command code of the command 300 that is transferred and by referring to a device command table 302 and collating the command code with the device command table 302. Due to this, it is possible for both the CPU 101 and the sub CPU 201 to determine the transfer protocol of the command 300 and it is made possible to control transmission/reception of data in accordance with the command 300 between the main controller 100 and the HDD 116.

Figure 4:
FIG. 4 is an example of a command table.

FIG. 4 is an example of a command table for commands in conformity with the SATA standard, in which a command code to identify each command and information on the transfer protocol of each command are described. In the case where data communication is performed between the main controller 100 and the HDD 116, in order to know the transfer protocol of a command, the CPU 101 and the sub CPU 201 refer to the command table such as this, respectively. The command table in FIG. 4 includes a "Command No." column 401, a "Command code" column 402, and a "Transfer protocol" column 403. Then, the host command table 301 is saved within the ROM 106 and loaded onto the DRAM 107 at the time of activation of the MFP 10. The device command table 302 is saved within the sub ROM 202 and loaded onto the sub RAM 203 at the time of activation of the HDD 116.

In the "Command No." column 401 of the command table, as the management numbers of commands, sequential numbers 0 to 255 are described. Further, in the "Command code" column 402, "0x00" to "0xff" are described as a list of command codes of the SATA standard. Here, "0x" in the command code indicates that the number is hexadecimal. Each command code within this "Command code" column 402 is written in a Command area of a "RegHD-FIS", to be described later, and becomes an identifier of the command. In the "Transfer protocol" column 403, as the transfer protocol of each command, a protocol, such as a "PIO data IN", a "PIO data Out", and a "NonData", is descried. The command code whose "Transfer protocol" column 403 is empty (e.g., 0xc1 to 0xc3, and so on) can be used as the vendor-unique command described previously.

Figure 5:
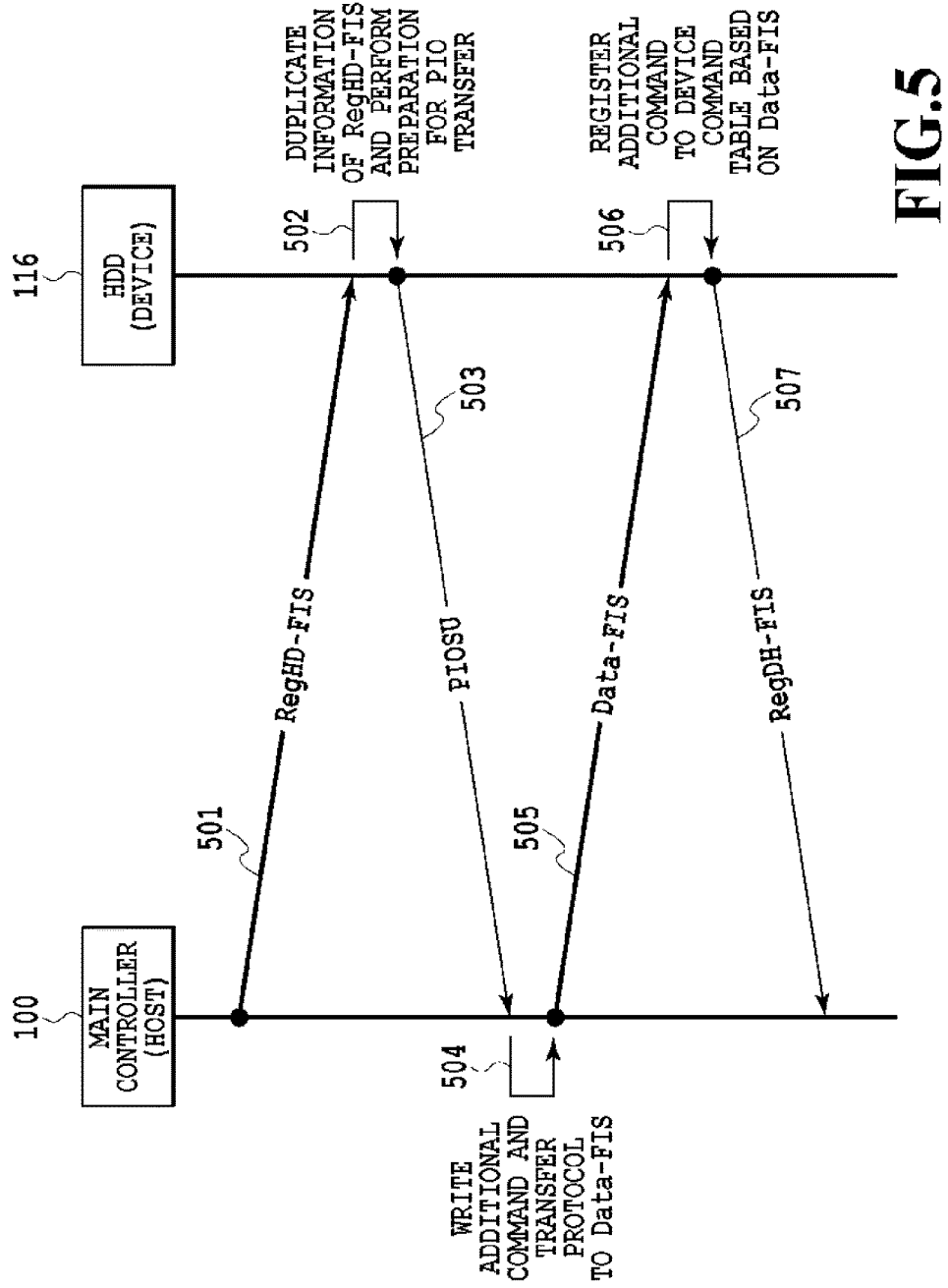
FIG. 5 is a diagram showing an example of command transfer between the main controller and the HDD.

FIG. 5 is a diagram showing an example of command transfer between the main controller 100 and the HDD 116. The protocol control of a command in the SATA standard is performed for each frame called a FIS (Frame Instruction Structure). In the present embodiment, a dedicated setting command (hereinafter, called "setup command") is transferred to the HDD 116 by the CPU 101 within the main controller 100 by using a data communication line. By this setup command, the HDD 116 is notified of the command code of a vendor-unique command to be added newly and the transfer protocol corresponding to the command code by the main controller 100. In the following, explanation is given by an example in which a "command" is used as the command code of the setup command and as its transfer protocol, the "PIO data Out" protocol is used. Specifically, by a procedure shown below (corresponding to symbols 501 to 507 in FIG. 5), the setting of an additional command using the setup command is implemented.

501: transmit the "RegHD-FIS" to the HDD 116 from the main controller 100

502: duplicate the "RegHD-FIS" in the HDD 116 and perform preparation for PIO transfer 503: notify the main controller 100 of the completion of preparation for PIO transfer by the "PIOSU"

504: write the additional command and its transfer protocol to the "Data-FIS" in the main controller 100

505: transmit the "Data-FIS" to which the additional command and its transfer protocol are written to the HDD 116

506: register the additional command to the device command table 302 based on the received "Data-FIS" in the HDD 116

507: notify the main controller 100 of the completion of the registration of the additional command by the "RegDH-FIS"

RegHD means "Register Host to Device" and RegDH means "Register Device to Host".

FIG. 6A to FIG. 6D each show the structure of the FIS that is used at the time of performing data communication by the "PIO data Out" protocol. The "RegHD-FIS" in FIG. 6A is the FIS that is used at the time of the main controller 100 giving instructions to the HDD 116. By the main controller 100 transmitting the "RegHD-FIS" to the HDD 116, the series of flow shown in FIG. 9A to FIG. 11 below is started. Further, in the "RegHD-FIS", all the registers necessary for command transfer are included. In a Command area 601 thereof, one of the command codes within the "Command code" column 402 within the command table shown in FIG. 4 is described and this serves as the identifier to identify which command of the SATA. The "Data-FIS" in FIG. 6B is used at the time of performing data communication between the main controller 100 and the HDD 116. To a Data area 602 thereof, data that is actually transmitted and received by the transfer is written by the CPU 101.

FIG. 7 is a diagram showing details of a setup command according to the present embodiment. A setup command 700 includes the "RegHD-FIS" and the "Data-FIS". To the Command area 601 within the "RegHD-FIS", the command code of the setup command is written by the CPU 101. The command code (here, "0xF0") of the setup command itself is also a vendor-unique command, and therefore, within the host command table 301 and the device command table 302, this command is associated in advance with a transfer protocol.

Then, to the Data area 602 within the "Data-FIS", the command code and the transfer protocol of a command that is not defined yet and which is desired to be added are written by the CPU 101. For example, the case is considered where it is desired to associate the command code of "0xC1" that can be set as a vendor-unique command with the transfer protocol "PIO data In". Here, an example is shown in which each one byte is used within the Data area 602 and as the command code of an undefined additional command, "0xC1" is stored and as the transfer protocol of the additional command, "0x01" is stored. By storing the command code "0xC1" and the transfer protocol "0x01" thereof of the additional command in the Data area 602 based on a transfer protocol table 800, to be described later, the "PIO data In" is replaced with a transfer protocol code. Due to this, it is made possible for the CPU 101 to notify the HDD 116 of information on an undefined additional command.

Figure 8:
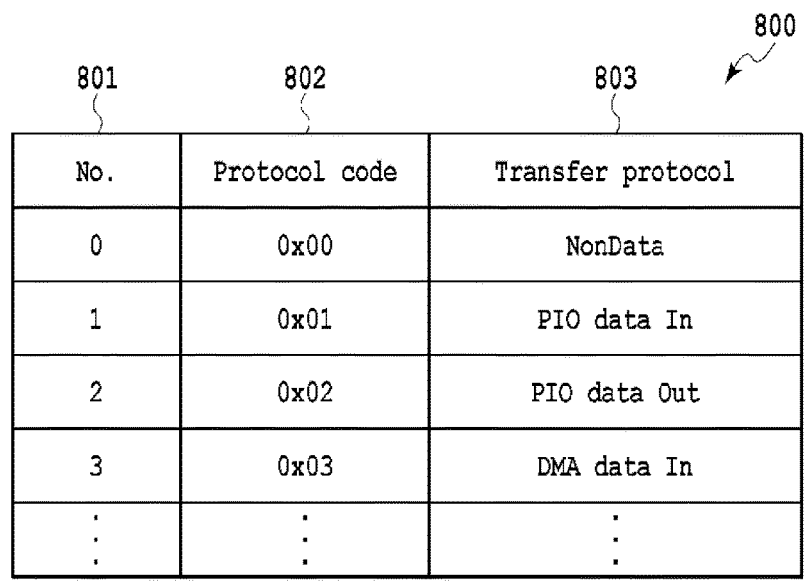
FIG. 8 is a diagram showing a transfer protocol table.

FIG. 8 shows the transfer protocol table. This transfer protocol table 800 is referred to at the time of the CPU 101 embedding a transfer protocol (e.g., "0x01") in the "Data-FIS" of the setup command shown in FIG. 7. Further, the transfer protocol table 800 is referred to at the time of the sub CPU 201 determining the transfer protocol ("0x01") corresponding to the command code from the received "Data-FIS". The transfer protocol table 800 includes a "Transfer protocol No." column 801, a "Protocol code" column 802, and a "Transfer protocol" column 803. The transfer protocol table 800 is saved within the ROM 106 on the main controller 100 side and saved within the sub ROM 202 on the HDD 116 side.

In the "Transfer protocol No." column 801 of the transfer protocol table 800, as the management numbers of transfer protocols, sequential numbers 0 to n are described. In the "Protocol code" column 802, the protocol code obtained by coding a transfer protocol is described and used at the time of embedding a transfer protocol (e.g., "0x01") in the "Data-FIS". In the "Transfer protocol" column 803, the "PIO data In", the "PIO data Out", the "NonData", and so on, which are the protocols at the time of transfer of a command, are described.

Figure 9A:
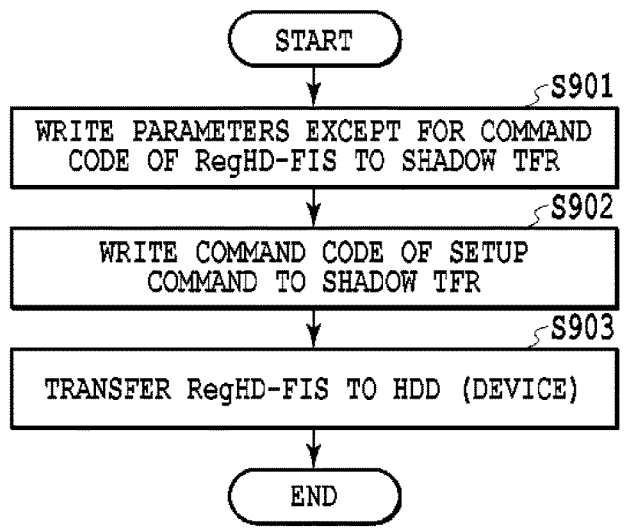
FIG. 9A is a flowchart showing a flow of processing for the host to transmit a RegHD-FIS to the device and FIG. 9B is a flowchart showing a flow of processing for the device to duplicate the received RegHD-FIS.

FIG. 9A is a flowchart showing a flow of processing (501 described previously) for the main controller 100, which is a host, to transmit the "RegHD-FIS" including the setup command to the HDD 116, which is a device. Then, FIG. 9B is a flowchart showing a flow of processing (502 described previously) for the HDD 116, which is a device, to duplicate the received "RegHD-FIS".

The flow in FIG. 9A on the host side is explained. First, at step 901, the CPU 101 of the main controller 100 writes necessary information of the "RegHD-FIS" (except for the Command area 601) to a shadow TFR within the SATA I/F 104. Here, the "shadow TFR" is the abbreviation of the shadow/task file register. Next, at step 902, the CPU 101 writes the command code (here, "0xF0") of the setup command to the above-described shadow TFR as information of the Command area 601 of the "RegHD-FIS". Then, at step 903, the CPU 101 transfers the "RegHD-FIS" to the HDD 116.

Figure 9B:
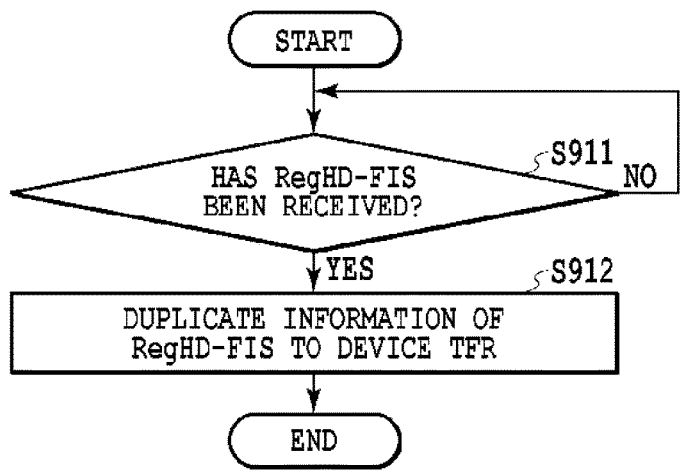

Next, the flow in FIG. 9B on the device side is explained. First, at step 911, the sub CPU 201 of the HDD 116 determines whether the "RegHD-FIS" has been received from the main controller 100. In the case where the "RegHD-FIS" has been received, the processing advance to step 912 and in the case where the "RegHD-FIS" has not been received, monitoring of the reception of the "RegHD-FIS" is continued. Then, at step 912, the sub CPU 201 duplicates the contents of the "RegHD-FIS" received from the main controller 100 in the device TRF within the SATA I/F 204. Here, the "device TFR" is the abbreviation of the device/task file register.

By the information of the shadow TFR of the main controller 100 being duplicated in the device TFR of the HDD 116 as described above, the state is brought about where information of the task file register can be shared between the CPU 101 on the host side and the sub CPU 201 on the device side.

Figure 10A:
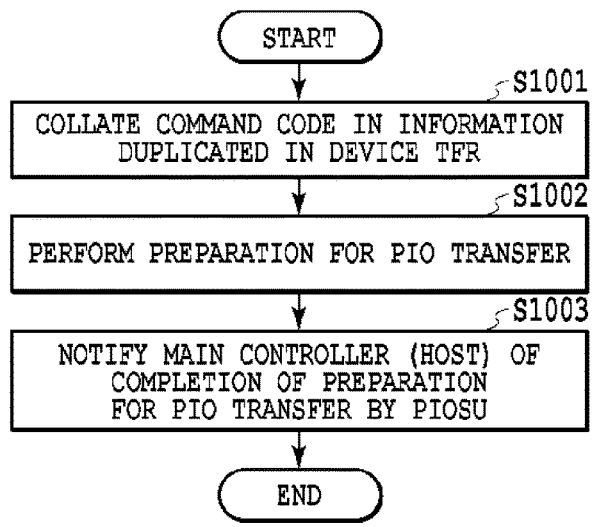
FIG. 10A is a flowchart showing a flow of processing for the device to notify the host of the completion of preparation for PIO transfer and FIG. 10B is a flowchart showing a flow of processing for the host to transfer a Data-FIS to the device in response to the notification of the completion of preparation for PIO transfer.
Figure 10B:
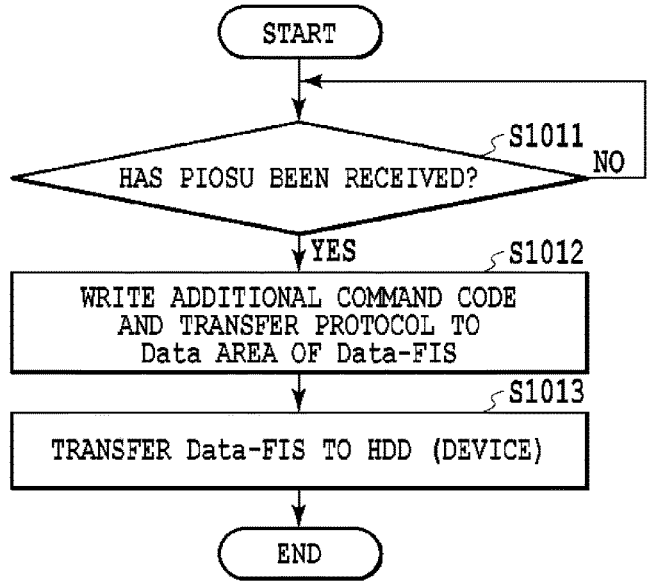

FIG. 10A is a flowchart showing a flow of processing (503 described previously) for the HDD 116, which is the device side, to notify the main controller 100 of the completion of preparation for PIO transfer based on information of the received "RegHD-FIS". Then, FIG. 10B is a flowchart showing a flow of processing (504 and 505 described previously) for the main controller 100, which is the host side, to transfer the "Data-FIS" storing information on a command desired to be added to the HDD 116 in response to the notification of the completion of preparation for PIO transfer. PIO is the abbreviation of Programmed Input/Output.

The flow in FIG. 10A on the device side is explained. First, at step 1001, the sub CPU 201 of the HDD 116 collates the command code (here, "0xF0") included in the information duplicated in the device TFR by using the device command table 302. Due to this, the sub CPU 201 recognizes that it is possible to process the setup command by the flow in accordance with the "PIO data Out" protocol. At step 1002 that follows, the sub CPU 201 performs preparation for PIO transfer. On the completion of preparation for PIO transfer, the sub CPU 201 writes information of each area of "PIOSU" shown in FIG. 6C to the device TFR. Then, the sub CPU 201 notifies the main controller 100 of that the preparation for PIO transfer is completed by using the "PIOSU".

Next, the flow in FIG. 10B on the host side is explained. First, at step 1011, the CPU 101 of the main controller 100 determines whether or not the "PIOSU" has been received from the HDD 116. In the case where the "PIOSU" has been received, the processing advances to step 1012 and in the case where the "PIOSU" has not been received, monitoring of the reception of the "PIOSU" is continued. Then, at step 1012, the CPU 101 writes the information of each area of the "Data-FIS" to the shadow TFR. Specifically, the information on the command code (here, "0xC1") of a command desired to be added and the transfer protocol (here "0x01") of the additional command is written to the shadow TFR. At the time of this write, one byte within the data area is used for both the additional command and the transfer protocol thereof. Further, at the time of the write of the transfer protocol, the transfer protocol table 800 described previously is referred to and the transfer protocol code corresponding to the additional command code is used. Due to this, the state is brought about where the information on the command code and the transfer protocol is stored in the Data area 602 of the "Data-FIS". Then, at step 1013, the CPU 101 transfers the "Data-FIS" to which necessary information is written to the HDD 116.

Figure 11:
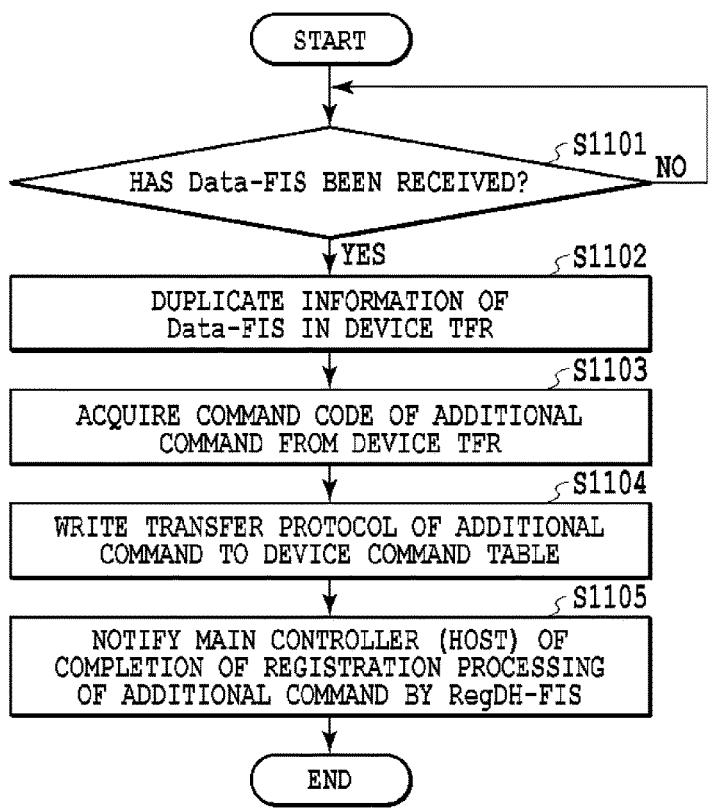
FIG. 11 is a flowchart showing a flow of processing to notify the host of the registration of an additional command and the completion thereof in the device according to the first embodiment.

FIG. 11 is a flowchart showing a flow of processing (506 and 507 described previously) for the HDD 116, which is the device side, to register an additional command to the device command table based on the received "Data-FIS" and to notify the main controller 100 of the completion thereof.

First, at step 1101, the sub CPU 201 within the HDD 116 determines whether the "Data-FIS" has been received from the main controller 100. In the case where the "Data-FIS" has been received, the processing advances to step 1102 and in the case where the "Data-FIS" has not been received, monitoring of the reception of the "Data-FIS" is continued.

At step 1102, the sub CPU 201 duplicates the information of the Data area of the received "Data-FIS" in the device TFR within the SATA I/F 204. Then, at step 1103, the sub CPU 201 reads and acquires the command code (here, "0xC1") of the additional command from the device TFR.

Following the above, at step 1104, the sub CPU 201 writes the transfer protocol (here, "0x01") of the additional command relating to the acquired command code to the device command table 302. Specifically, the procedure is as follows. First, the sub CPU 201 refers to the "Command code" column 401 within the device command table in order from the top and stops the write specifying pointer at the position of the read command code ("0xC1"). Next, the sub CPU 201 writes the transfer protocol ("0x01") of the additional command duplicated within the device TFR to the portion of the "Transfer protocol" column 402 of the command code.

Then, at step 1105, the sub CPU 201 notifies the main controller 100 of that the registration processing of the additional command to the device command table 302 is completed by using the "RegDH-FIS".

By the above, the setting processing of an additional command in accordance with the setup command in the present embodiment is completed.

Figure 12A:
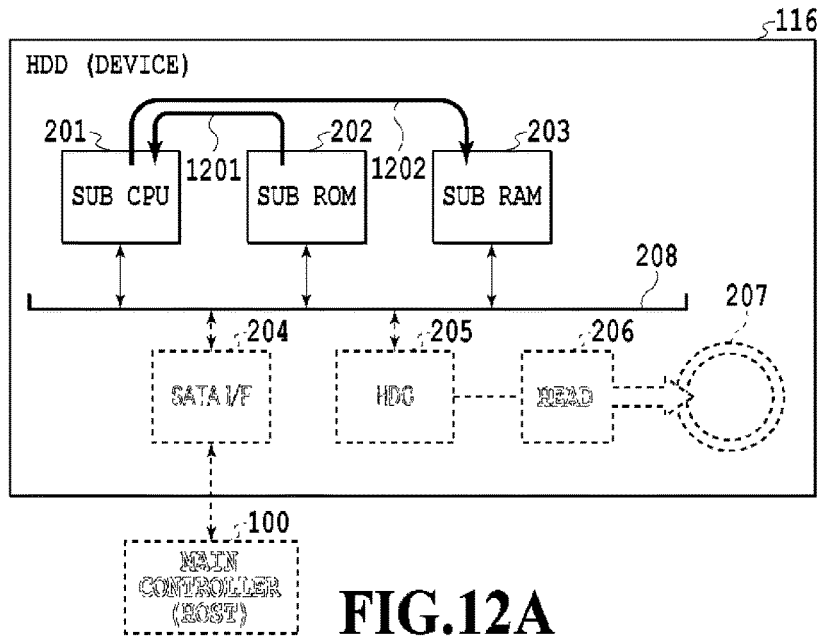
FIG. 12A is a diagram showing the way a device command table is loaded onto a RAM at the time of activation of the HDD and FIG. 12B is a diagram showing the way the device command table is saved in a ROM at the time of suspension of the HDD.
Figure 12B:
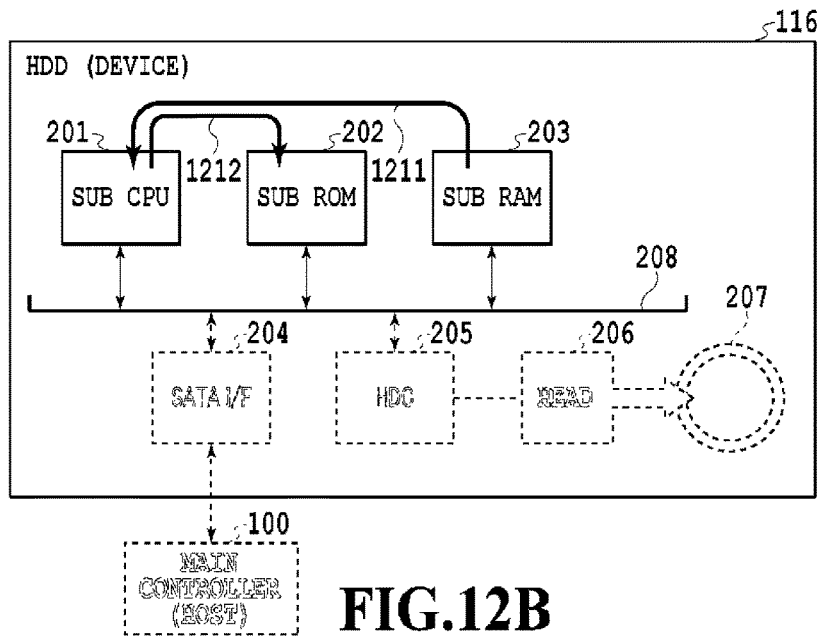

FIG. 12A is a diagram showing the way the device command table 302 is loaded onto the RAM on which the processing can be performed at a higher speed at the time of activation of the HDD 116 (at the time of operation to turn on the power source of the MFP 10). The device command table 302 is saved in the sub ROM 202 in the case where the power source of the HDD 116 is in the OFF state. In response to the operation to turn on the power source of the HDD 116, the device command table 302 is read (arrow 1201) from the sub ROM 202 by the sub CPU 201 and loaded onto the sub RAM 203 (arrow 1202). On the other hand, FIG. 12B is a diagram showing the way the device command table 302 is saved in the sub ROM 202 that is also writable so that information is maintained even in the case where power source supply is cut off at the time of suspension of the HDD 116 (at the time of operation to turn off the power source of the MFP 10). As described previously, addition of a vendor-unique command to the device command table 302 is performed during the operation of the HDD 116. Because of this, in the case where the operation to turn off the power source of the HDD 116 is performed, the sub CPU 201 performs the operation to save the device command table 302 in the sub ROM 202. Due to this, for the vendor-unique command, it is no longer necessary to perform the setting by sending again the setup command to the HDD 116 from the main controller 100 at the time of use thereof. In response to the operation to turn off the power source of the HDD 116, the sub CPU 201 reads the device command table 302 from the sub RAM 203 (arrow 1211) and saves the device command table 302 in the sub ROM 202 by overwriting (arrow 1212).

As above, by transferring the setup command storing information (command code and transfer protocol) on the additional command to the HDD 116 from the main controller 100, it is made possible to perform the setting of an additional command. Due to this, it is made possible to use a command in which the command code and the transfer protocol are not associated with each other, and therefore, which cannot be used so far.

For example, at first, no transfer protocol is associated with a certain vendor-unique command and a state where the vendor-unique command cannot be used is maintained. Then, in the case where an error occurs, by using the setup command, a transfer protocol is associated with the vendor-unique command. By doing so, it is made possible for the vendor-unique command to be used and it is also made possible for information within the HDD 116 to be taken up by the main controller 100, which is a host. In this manner, usually, the state where a specific vendor-unique command cannot be used is maintained (hidden command) and it is possible to make use of the hidden command in accordance with the necessity.

Second Embodiment

In the first embodiment, the configuration is such that the main controller as a host and the HDD as a device are connected directly in a one-to-one manner. Next, an aspect is explained as a second embodiment in which a vendor-unique command is added to a bridge chip in a configuration (SATA-SATA bridge configuration) in which a bridge chip is sandwiched between a main controller as a host and an HDD as a device. The bridge chip that is used in the configuration of the present embodiment has a function to transfer a command transferred from the host side to the device side. In this case, unless the bridge chip knows the transfer protocol of the vendor-unique command, it is not possible to transfer the vendor-unique command transferred from the host side to the device side, and therefore, the bridge chip returns an error as a result.

Consequently, in the present embodiment, a state where a vendor-unique command can be used is brought about by sending the setup command to the bridge chip, and thereby, it is made possible for the bridge chip to transfer the vendor-unique command to the device side. The contents in common to those of the first embodiment are omitted or simplified and in the following, different points are explained mainly.

Figure 13:
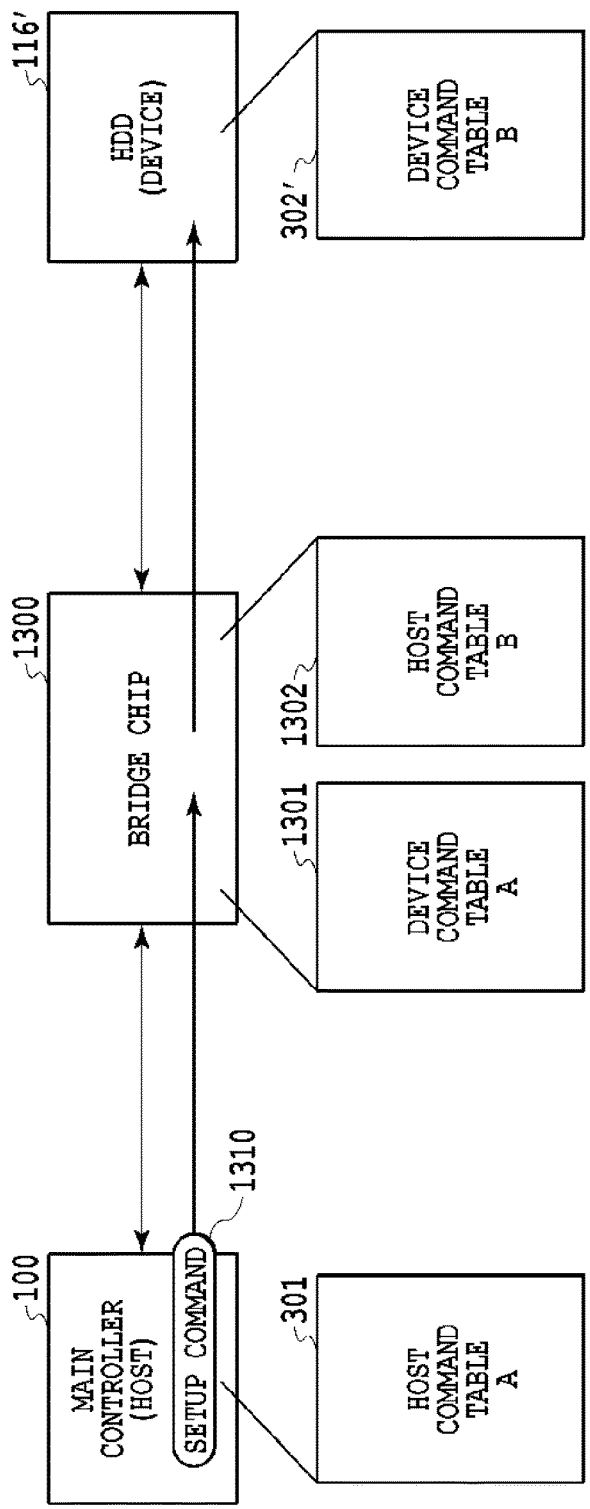
FIG. 13 is a diagram showing an outline of command transfer via a bridge chip according to a second embodiment.

FIG. 13 is a diagram showing an outline of command transfer via a bridge chip according to the present embodiment. As explained in the first embodiment, each command table is held in a pair relationship of a host and a device. Consequently, a bridge chip 1300 has two command tables as shown in FIG. 13. That is, the bridge chip 1300 has a device command table A 1301 corresponding to the host command table 301 of the main controller 100 and a host command table B 1302 corresponding to a device command table 302' of an HDD 116'. In the present embodiment, from the main controller 100, a setup command 1310 is sent to the bridge chip 1300 and a command is added to the device command table A 1301 and the host command table B 1302 within the bridge chip 1300. Then, by this addition of a command, it is made possible for the main controller 100 to transfer a new vendor-unique command to the HDD 116'. In the present embodiment, it is assumed that information relating to a command to be added is shared between the main controller 100 and the HDD 116'.

Figure 14:
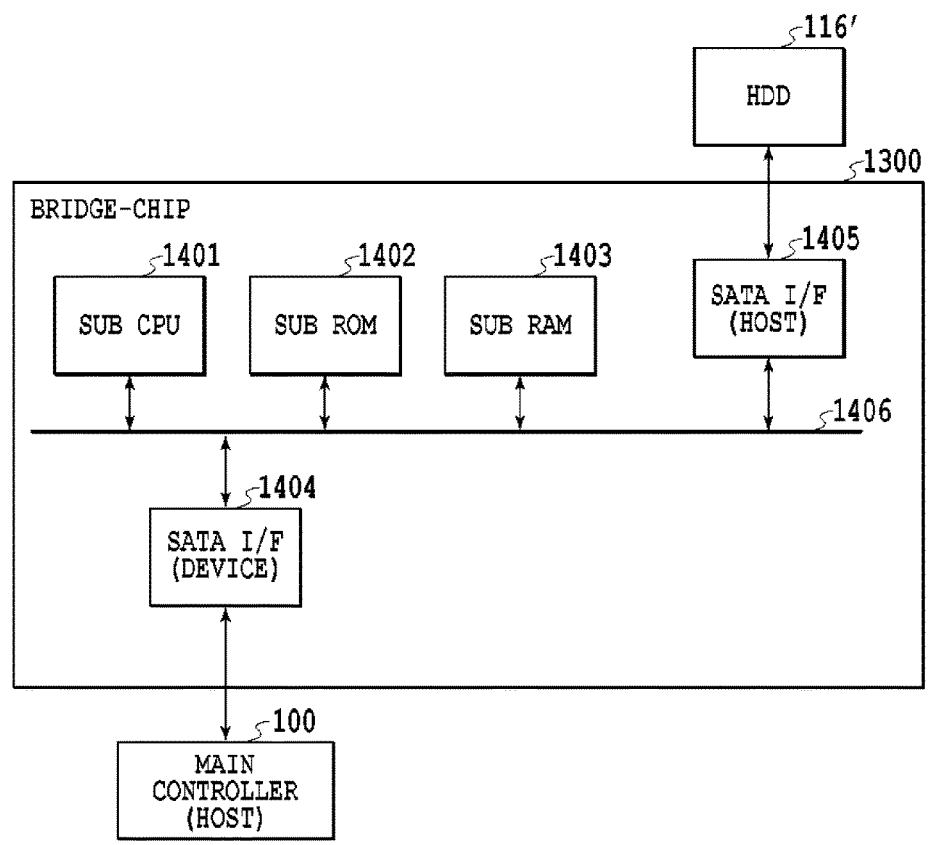
FIG. 14 is a block diagram showing an internal configuration of the bridge chip.

FIG. 14 is a block diagram showing an internal configuration of the bridge chip 1300. A sub CPU 1401 is a processor that performs processing of a command of the SATA standard, such as transmission of a command to the HDD 116'. A sub ROM 1402 is a read-only memory that stores activation programs of the sub CPU 1401 and data of setting values of various modes. A sub RAM 1403 is a readable/writable memory that is used as a work area of the sub CPU 1401 and a loading area of a command table. A SATA-I/F (Device) 1404 is an interface that inputs and output commands and data to and from the main controller 100. A SATA-I/F (Host) 1405 is an interface that inputs and outputs commands and data to and from the HDD 116'. Then, the sub CPU 1401, the sub ROM 1402, the sub RAM 1403, the SATA-I/F (Device) 1404, and the SATA-I/F (Host) 1405 are connected to one another via a bus 1406. The HDD 116' of the present embodiment does not have configurations, such as a sub CPU, a sub ROM, and a sub RAM, unlike the first embodiment, and the HDD 116' includes the SATA-I/F 204, the HDC 205, the head 206, and the magnetic disc 207 of the configurations shown in FIG. 2 described previously.

Figure 15:
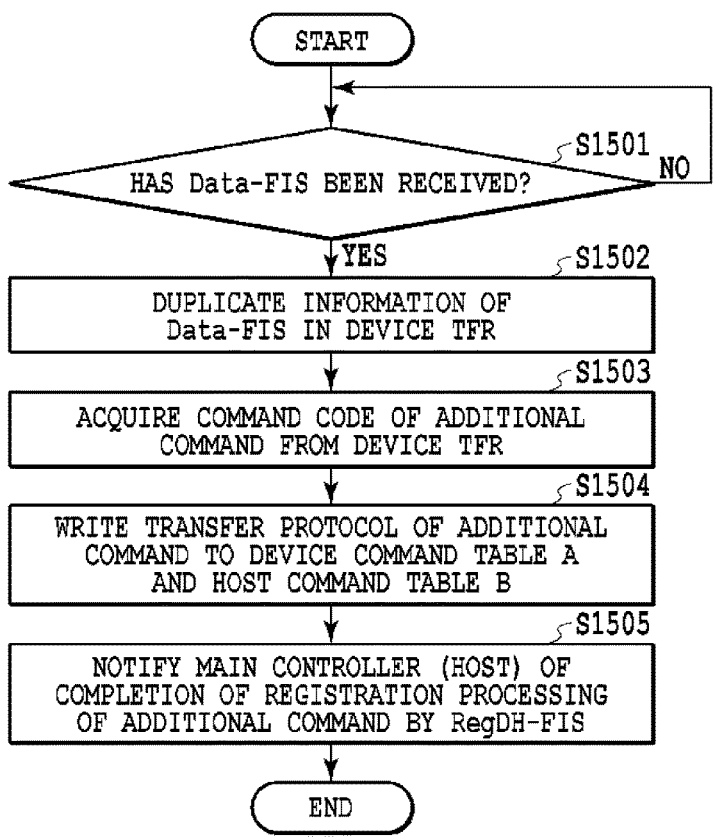
FIG. 15 is a flowchart showing a flow of processing to notify the host of the registration of an additional command and the completion thereof in the bridge chip according to the second embodiment.

FIG. 15 is a flowchart of the present embodiment corresponding to FIG. 11 of the first embodiment. That is, FIG. 15 is a flowchart showing a flow from the registration by the bridge chip 1300 of an additional command to the device command table A 1301 and the host command table B 1302 based on the "Data-FIS" received from the main controller 100 until the notification of the completion of the registration. The device command table A 1301 and the host command table B 1302 are saved in the sub ROM 1402 and used by being loaded onto the sub RAM 1403 accompanying the activation of the bridge chip 1300.

As to the procedure up to the start of this flow, it is sufficient to read the "HDD 116" in the explanation given in the first embodiment described previously as the "bridge chip 1300". That is, first, the main controller 100 sets the "RegHD-FIS" of the setup command 1310 and transfers the "RegHD-FIS" to the bridge chip 1300 (corresponding to the flow in FIG. 9A described previously). The bridge chip 1300 having received the "RegHD-FIS" performs preparation for PIO transfer and notifies the main controller 100 of the completion thereof by the "PIOSU" (corresponding to the flows in FIG. 9B and FIG. 10A described previously). Then, upon receipt of the "Data-FIS" to which the additional command and the transfer protocol thereof are written from the main controller 100 (corresponding to the flow in FIG. 10B described previously), the bridge chip 1300 performs each step below.

First, at step 1501, the sub CPU 1401 within the bridge chip 1300 determines whether the "Data-FIS" has been received from the main controller 100. In the case where the "Data-FIS" has been received, the processing advances to step 1502 and in the case where the "Data-FIS" has not been received, monitoring of the reception of the "Data-FIS" is continued.

At step 1502, the sub CPU 1401 duplicates the information of the Data area of the received "Data-FIS" in the device TFR within the SATA-I/F 1404. Then, at step 1503, the sub CPU 1401 reads and acquires the command code of the additional command from the device TFR.

Following the above, at step 1504, the sub CPU 1401 writes the transfer protocol of the additional command relating to the acquired command code to the device command table A 1301 and the host command table B 1302. Specifically, the procedure is as follows. First, the sub CPU 1401 refers to the "Command code" column 401 within the device command table A 1301 in order from the top and stops the write specifying pointer at the position of the read command code. Next, the sub CPU 1401 writes the transfer protocol of the additional command that is duplicated within the device TFR to the portion of the "Transfer protocol" column 402 of the command code. Further, the sub CPU 1401 similarly refers to the "Command code" column 401 within the host command table B 1302 in order from the top and writes the transfer protocol of the additional command to the portion of the "Transfer protocol" column 402 of the read command code.

Then, at step 1505, the sub CPU 1401 notifies the main controller 100 of that the registration processing of the additional command to both the command tables is completed by using the "RegDH-FIS".

By the above, the setting processing of the additional command in the bridge chip in accordance with the setup command 1310 is completed. Due to this, for example, it is possible to flexibly deal with the case where the vendor-unique command to be used changes because the storage device, such as the HDD, which is connected ahead of the bridge chip is changed. That is, in the bridge chip not having a sufficient configuration to add a command, unlike the host, it is made possible to easily add a vendor-unique command.

According to the present embodiment, in the SATA-SATA bridge configuration, as in the first embodiment, it is possible to add a vendor-unique command to the bridge chip.

Third Embodiment

Next, an aspect is explained as a third embodiment in which a command is added also to the HDD as a device by the setup command from the host side in the same SATA-SATA bridge configuration as that of the second embodiment. The contents in common to those of the first and second embodiments are omitted or simplified and in the following, different points are explained mainly.

Figure 16:
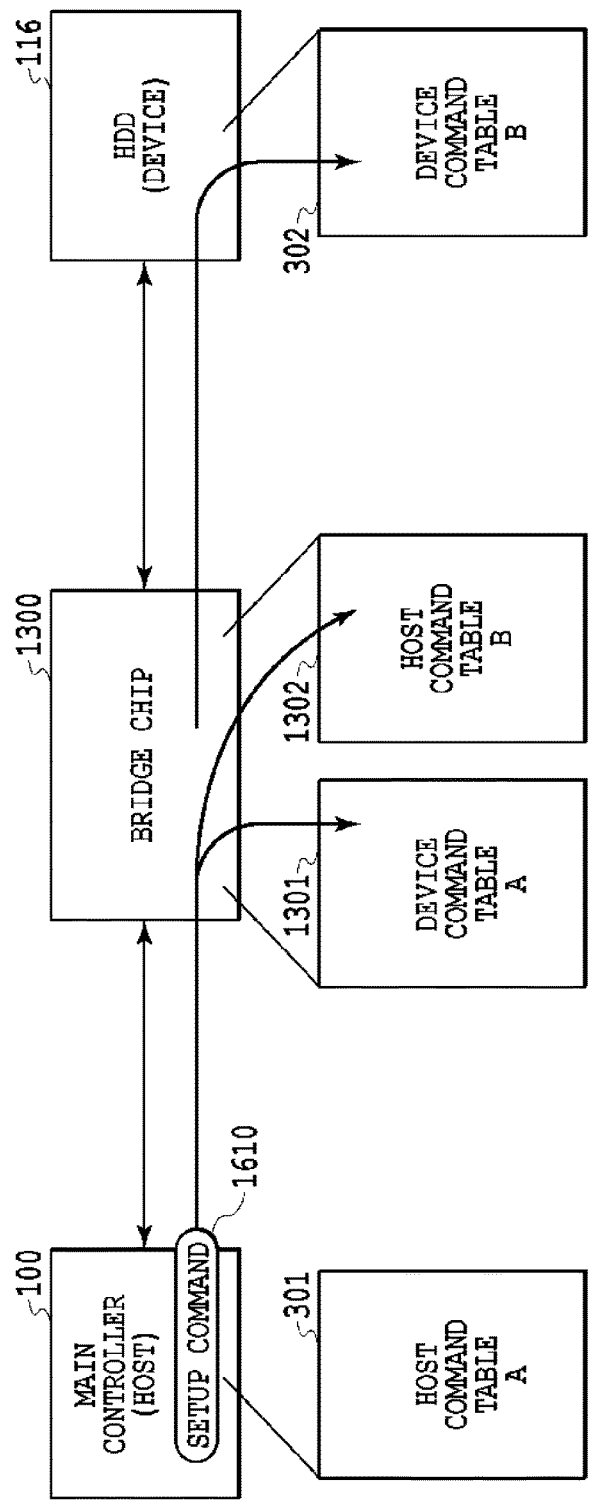
FIG. 16 is a diagram showing an outline of command transfer via the bridge chip according to a third embodiment.

FIG. 16 is a diagram showing an outline of command transfer via a bridge chip according to the present embodiment. In the SATA-SATA bridge configuration, the main controller 100, the bridge chip 1300, and the HDD 116 are connected and the bridge chip 1300 has the device command table A 1301 and the host command table B 1302. However, the configuration of the HDD 116 of the present embodiment is the same as that of the first embodiment. That is, as shown in FIG. 2 described previously, the sub CPU 201, the sub ROM 202, the sub RAM 203, the SATA-I/F 204, and the HDC 205 are connected to one another via the bus 208 and the head 206 and the magnetic disc 207 are further included.

Figure 17:
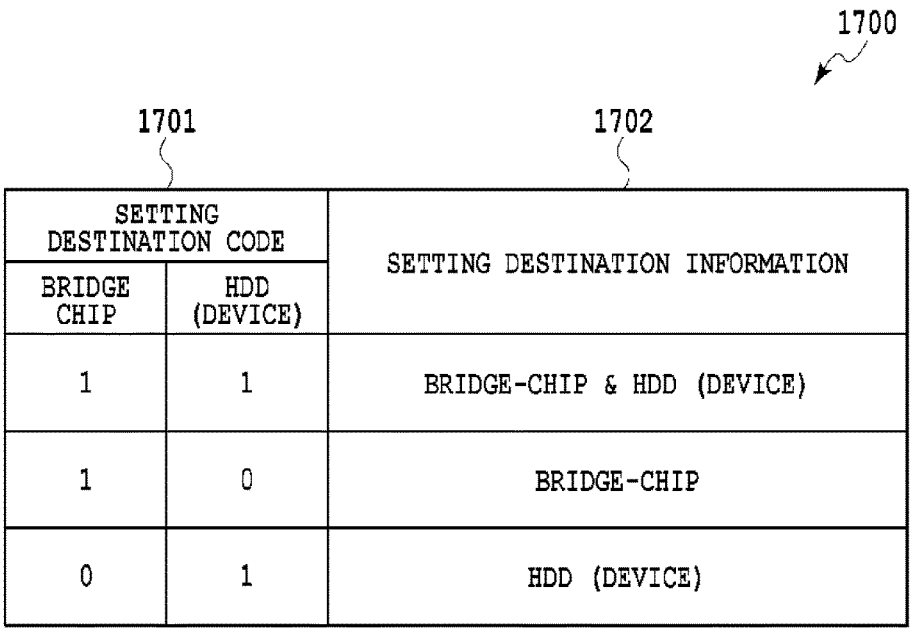
FIG. 17 is a diagram showing a code table.

In the present embodiment, in a setup command 1610 that is sent from the main controller 100, which is a host, a setting destination code to specify the setting destination of an additional command is included, in addition to the command code and the transfer protocol of a command desired to be added, FIG. 17 shows a code table that specifies setting destination codes that can be used in the present embodiment. A code table 1700 includes a "Setting destination code" column 1701 and a "Setting destination information" column 1702. In the "Setting destination code" column 1701, information on the code indicating the setting destination of an additional command is described and each setting destination code is managed by 2-bit data. Specifically, the 2-bit data represents the case where the setting destination is set to the bridge chip 1300 and the HDD 116, respectively, by "1" and the case where the setting destination is not set by "0". In the "Setting destination information" column 1702, the name of the hardware, which is the setting destination, is described. By the setting destination code such as this, it is possible to arbitrarily make a selection between addition of a command to only one of the bridge chip 1300 and the HDD 116 and addition of a command to both the bridge chip 1300 and the HDD 116.

FIG. 18 is a diagram showing an example of an internal configuration of the "RegHD-FIS" and the "Data-FIS" of the setup command 1610 according to the present embodiment. Here, explanation is given by taking the case as an example where a vendor-unique command is newly added by using the "PIO data Out" as the transfer protocol as in the first embodiment. The "RegHD-FIS" is quite the same as that of the first embodiment, and therefore, explanation is omitted. To the "Data-FIS" shown in FIG. 18, in addition to the command code "0xC1" and the transfer protocol "0x01" of a command desired to be added, one of setting destination codes "0b11", "0b01", and "0b10" indicating which hardware this setup command 1610 performs the setting of an additional command for is written. Here, "0b" of the setting destination code indicates that the code is a binary number. The CPU 101 of the main controller 100 determines the write-target setting destination code in accordance with the above-described code table 1700. For example, in the case where it is desired to add a new vendor-unique command to both the bridge chip 1300 and the HDD 116', the setting destination code is "0b11" shown in FIG. 18.

Figure 19:
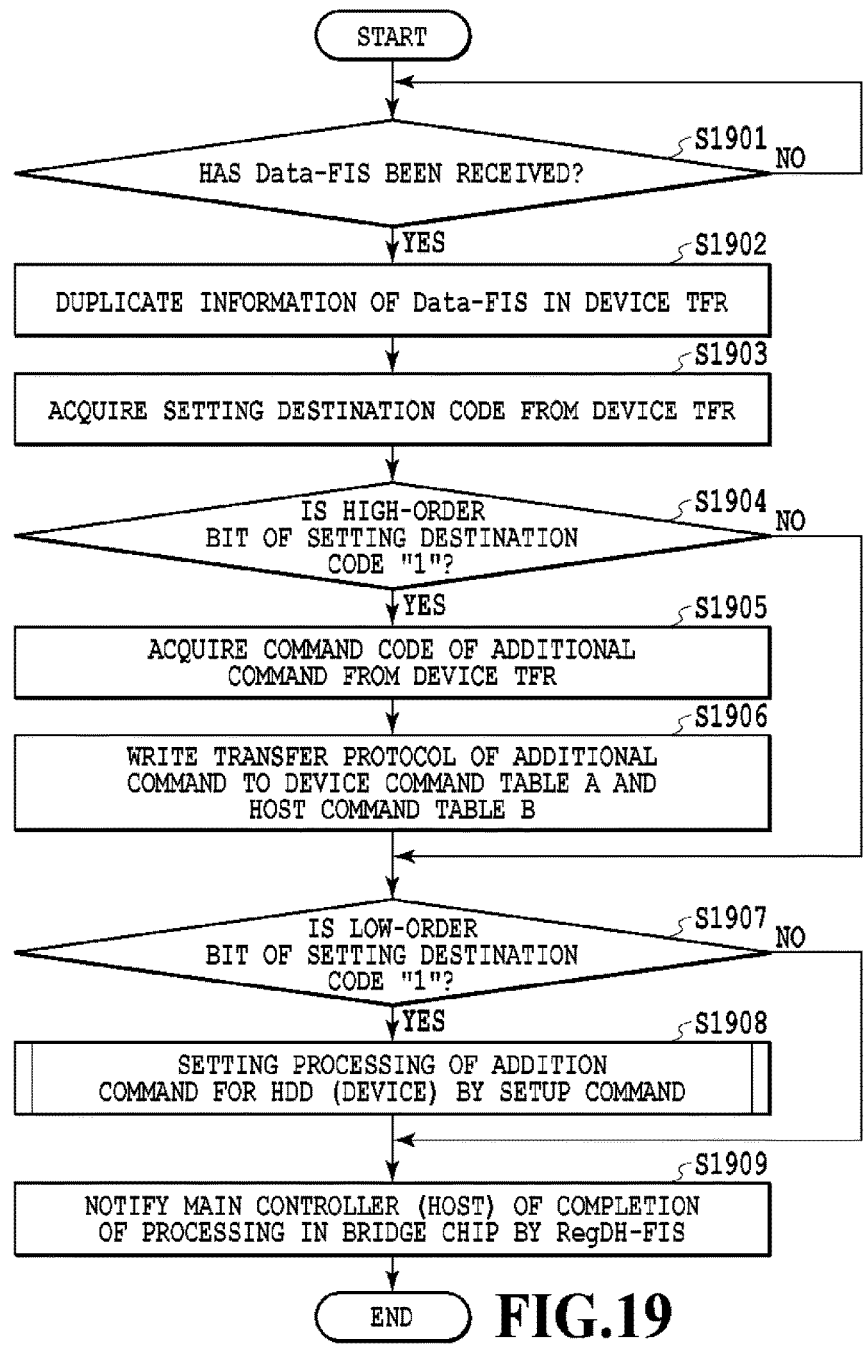
FIG. 19 is a flowchart showing a flow of processing to notify the host of the registration of an additional command and the completion thereof in the bridge chip according to the third embodiment.

FIG. 19 is a flowchart according to the present embodiment, which corresponds to FIG. 15 of the second embodiment. That is, FIG. 19 is a flowchart showing a flow from the registration by the bridge chip 1300 of an additional command to the command table of the destination specified by the setting destination code within the "Data-FIS" received from the main controller 100 until the notification of the completion of the registration to the main controller 100. The procedure up to the start of this flow is the same as that of the second embodiment. That is, first, the main controller 100 sets the "RegHD-FIS" of the setup command 1610 and transfers the "RegHD-FIS" to the bridge chip 1300. The bridge chip 1300 having received the "RegHD-FIS" performs preparation for PIO transfer and notifies the main controller 100 of the completion thereof by the "PIOSU". Then, upon receipt of the "Data-FIS" to which the additional command and the transfer protocol thereof are written from the main controller 100, the bridge chip 1300 performs each step below.

First, at step 1901, the sub CPU 1401 within the bridge chip 1300 determines whether the "Data-FIS" has been received from the main controller 100. In the case where the "Data-FIS" has been received, the processing advances to step 1902 and in the case where the "Data-FIS" has not been received, monitoring of the reception of the "Data-FIS" is continued.

At step 1902, the sub CPU 1401 duplicates the information of the Data area of the received "Data-FIS" in the device TFR within the SATA-I/F 1404. Then, at step 1903, the sub CPU 1401 reads and acquires the above-described setting destination code from the device TFR.

At step 1904, the sub CPU 1401 determines whether the value of the high-order bit of the acquired setting destination code is "1". In the case where the value of the high-order bit is "1", in order to perform the setting of the additional command for the command table within the bridge chip 1300, the processing advances to step 1905. On the other hand, in the case where the value of the high-order bit is "0", the setting of the additional command to the command table within the bridge chip 1300 is not necessary, and therefore, the processing advances to step 1907.

At step 1905, the sub CPU 1401 reads and acquires the command code of the additional command from the device TER. Then, at step 1906, the sub CPU 1401 writes the transfer protocol of the additional command relating to the acquired command code to the device command table A 1301 and the host command table B 1302. Specifically, the procedure is as follows. First, the sub CPU 1401 refers to the "Command code" column 1401 within the device command table A 1301 in order from the top and stops the write specifying pointer at the position of the read command code. Next, the sub CPU 1401 writes the transfer protocol of the additional command duplicated within the device TFR to the portion of the "Transfer protocol" column 402 of the command code. Further, the sub CPU 1401 similarly refers to the "Command code" column 401 within the host command table B 1302 in order from the top and writes the transfer protocol of the additional command to the portion of the "Transfer protocol" column 402 of the read command code.

At step 1907, the sub CPU 1401 determines whether the value of the low-order bit of the setting destination code acquired at step 1905 is "1". In the case where the value of the low-order bit is "1", in order to perform the setting of the additional command for the command table within the HDD 116, the processing advances to step 1908. On the other hand, in the case where the value of the low-order bit is "0", the setting of the additional to the command table within the HDD 116 is not necessary, and therefore, the processing advances to step 1909.

At step 1908, the bridge chip 1300 functions as a host. Specifically, the sub CPU 1401 performs the series of processing to transfer the setup command 1610 to the HDD 116 and to add the vendor-unique command between the sub CPU 1401 and the HDD 116. This series of processing is as described in the first embodiment, and therefore, explanation is omitted here.

Then, at step 1909, the sub CPU 1401 notifies the main controller 100 of that all the processing in the bridge chip 1300 has been completed by using the "RegDH-FIS".

By the above, the setting processing of the additional command in accordance with the setup command 1610 in the present embodiment is completed. Due to this, for example, it is also made possible to transfer a vendor-unique command to the HDD 116 from the main controller 100 via the bridge chip 1300, and it is also made possible to set a new vendor-unique command to the HDD 116.

According to the present embodiment, in the SATA-SATA bridge configuration, it is made possible to arbitrarily make a selection between the bridge chip alone, the device ahead of that alone, and both as the setting destination of an additional command by the setup command.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in communication control based on the SATA standard, it is possible to add a vendor-unique command in the case where it becomes necessary to add a vendor-unique command later even though a dedicated pin for updating is not possessed by the device side.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-152132 filed Aug. 2, 2016, which is hereby incorporated by reference wherein in its entirety.

What is claimed is:

1. An information processing system that performs data communication between a host and a device in conformity with a SATA standard, wherein the host transmits a setup command to which information on an undefined command is written to the device, and the device:
has a command table for commands in conformity with the SATA standard, in which a command code to identify each command and information on a transfer protocol of each command are described; and
makes the undefined command available between the host and the device by writing information on the undefined command to the command table in accordance with the received setup command.

2. The information processing system according to claim 1, wherein
the host transmits the setup command to which a command code of the undefined command and a transfer protocol of the undefined command are written as information on the undefined command by using a transfer protocol table in which protocol codes obtained by coding each transfer protocol are described.

3. The information processing system according to claim 2, wherein
the setup command includes a RegHD-FIS and a Data-FIS, and
the host transmits the RegHD-FIS to which a command code of the setup command is written to the device and in response to notification of completion of preparation for PIO transfer from the device having received the RegHD-FIS, transmits the Data-FIS to which a command code of the undefined command and a transfer protocol of the undefined command are written to the device.

4. The information processing system according to claim 3, wherein
the device:
performs preparation for the PIO transfer after recognizing, by collating a command code of the setup command included in the RegHD-FIS received from the host with the command table, a transfer protocol of the setup command;
writes a command code of the undefined command and a transfer protocol of the undefined command included in the Data-FIS received from the host to the command table; and
notifies the host of completion of the write to the command table by using a RegDH-FIS.

5. The information processing system according to claim 1, wherein
the information processing system is an information processing apparatus having a controller as the host and a large-capacity storage device as the device,
the large-capacity storage device has a processor that performs control including processing of a command based on the SATA standard, a writable ROM that stores control programs to activate the large-capacity storage device, and a RAM that is used as a work area of the processor, and
the processor of the large-capacity storage device:
saves the command table in the ROM of the large-capacity storage device in response to an operation to turn off a power source of the information processing apparatus; and
enables the write by reading the command table saved in the ROM and loading the command table onto the RAM in response to an operation to turn on a power source of the information processing apparatus.

6. An information processing system that comprises a bridge configuration in which a bridge chip is connected to a host and a device is connected to the bridge chip and which performs data communication between the host and the device in conformity with a SATA standard, wherein
the host transmits a setup command to which information on an undefined command is written to the bridge chip, and
the bridge chip:
has a command table for commands in conformity with the SATA standard, in which a command code to identify each command and information on a transfer protocol of each command are described; and
makes the undefined command available between the host, the bridge chip, and the device by writing information on the undefined command to the command table in accordance with the received setup command.

7. The information processing system according to claim 6, wherein
the host transmits the setup command to which a command code of the undefined command and a transfer protocol of the undefined command are written as information on the undefined command by using a transfer protocol table in which protocol codes obtained by coding each transfer protocol are described.

8. The information processing system according to claim 7, wherein
the setup command includes a RegHD-FIS and a Data-FIS, and
the host transmits the RegHD-FIS to which a command code of the setup command is written to the bridge chip and in response to notification of completion of preparation for PIO transfer from the bridge chip having received the RegHD-FIS, transmits the Data-FIS to which a command code of the undefined command and a transfer protocol of the undefined command are written to the bridge chip.

9. The information processing system according to claim 8, wherein
the bridge chip:
performs preparation for the PIO transfer after recognizing, by collating a command code of the setup command included in the RegHD-FIS received from the host with the command table, a transfer protocol of the setup command;
writes a command code of the undefined command and a transfer protocol of the undefined command included in the Data-FIS received from the host to the command table; and
notifies the host of completion of the write to the command table by using a RegDH-FIS.

10. An information processing system that comprises a bridge configuration in which a bridge chip is connected to a host and a device is connected to the bridge chip and which performs data communication between the host and the device in conformity with a SATA standard, wherein
the host transmits a setup command to which information on an undefined command and a setting destination code to specify a setting destination of the undefined command are written to the bridge chip,
the bridge chip transmits the setup command received from the host to the device in accordance with the setting destination code, and
the bridge chip and the device:
have a command table for commands in conformity with the SATA standard, in which a command code to identify each command and information on a transfer protocol of each command are described; and make the undefined command available between the host and the device by writing information on the undefined command to the command table in accordance with the received setup command.

11. The information processing system according to claim 10, wherein the bridge chip does not transmit the received setup command to the device in a case where the device is not specified as a setting destination of the undefined command in the setting destination code included in the setup command received from the host.

12. A method of making an undefined command in a SATA standard available between a host and a device in an information processing system that performs data communication between the host and the device in conformity with the SATA standard, the method comprising:

a step of, by the host, transmitting a setup command to which information on an undefined command is written to the device; and a step of, by the device, writing information on the undefined command to a command table in accordance with the received setup command, wherein the command table is a table for commands in conformity with the SATA standard, in which a command code to identify each command and information on a transfer protocol of each command are described.

13. A non-transitory computer readable storage medium storing a program for causing a computer to perform a method of making an undefined command in a SATA standard available between a host and a device in an information processing system that performs data communication between the host and the device in conformity with the SATA standard, the method comprising:

a step of, by the host, transmitting a setup command to which information on an undefined command is written to the device; and a step of, by the device, writing information on the undefined command to a command table in accordance with the received setup command, wherein the command table is a table for commands in conformity with the SATA standard, in which a command code to identify each command and information on a transfer protocol of each command are described.

* * * * *